3,272,634
CONTINUOUS BREAD MAKING PROCESS WITH NORMALLY LIQUID SHORTENING
Paul M. Koren, Cincinnati, and Frank R. Schwain, Springfield Township, Hamilton County, Ohio, assignors to The Procter & Gamble Company, Cincinnati, Ohio, a corporation of Ohio
No Drawing. Filed Nov. 19, 1962, Ser. No. 238,727
7 Claims. (Cl. 99—90)

This invention relates to an improved method for making bread by the so-called continuous bread making process; more particularly, this invention relates to the use of normally liquid shortening, i.e., shortening which is fluid at normally encountered temperatures, in an apparatus suitable for continuous mixing and developing bread dough.

The practice of making commercial bread by the batch dough and sponge dough processes has been replaced, in many instances, by a more expedient method for manufacturing dough which is absolutely continuous from the point at which the dough ingredients are initially mixed until such time as the dough is placed in pans, finally proofed and ready for the oven. The continuous process has eliminated the need for the divider, rounder, overhead proofer and molder customarily employed in the straight dough and sponge dough processes. The elimination of these pieces of apparatus and their attendant functions has greatly reduced the time required for preparing bread dough; whereas six to seven hours were once required to process dough ingredients by the batch dough or sponge dough processes, the processing of continuously prepared bread dough can be completed in about one and one-half hours, including the time required for final proofing. The portion of this time essential to mixing and developing the dough is approximately three minutes.

In the United States, two continuous mixing systems are now employed in the large commercial bakeries. Although the equipment for carrying out these processes differs somewhat in mechanical detail, both processes are substantially similar in that they include a pre-mixer (or incorporator) and a high speed developer.

The basic process for continuously manufacturing bread is described by Baker in U.S. Patent 2,953,460, issued September 20, 1960. The Baker process is essentially a two-stage mixing operation: In the first mixing stage, the dough ingredients either in the form of the entire quantity of flour, salt, sugar, milk solids, shortening, oxidants and fermented yeast brew or in the form of a pre-established sponge together with additional flour, water, salt and other supplemental ingredients are thoroughly blended in a premixer which fully wets and combines all of the dough ingredients to yield a uniformly mixed dough which is essentially undeveloped; in the second mixing stage, the dough ingredients are developed in a high speed developer into a dough suitable for baking, after proofing, without further mixing or working. It is the second step, the developing or high speed mixing step, which makes the continuous bread making process particularly unique.

Lard or vegetable shortening that is solid or semi-solid at normally encountered temperatures is employed to shorten bread produced by the continuous process. A solid or semi-solid lard or vegetable shortening having a softening point of at least 110° F. is used because the plastic properties of such shortenings have been deemed essential to working the warm (e.i., between 100° F. and 110° F.) continuously mixed doughs. In the continuous process for manufacturing bread, lard is the most commonly employed shortening.

The plastic properties of the solid or semi-solid lard or vegetable shortening are usually modified by the baker just prior to use in the continuous bread making process by the baker's addition to the shortening of "hardflakes"; for example, flakes of fully hydrogenated lard or cottonseed oil having a melting point of about 140° F. It is also not uncommon for such bakery blended shortenings to include the permitted bread emulsifiers; for example, mono- and di-glycerides, tartaric acid esters, etc. In composing a suitable shortening composition, the baker must take into consideration the variations which occur in the other ingredients of the dough, particularly in the flour, and in the shortening itself, especially when the shortening is lard. The baker must vary the quantity of hardflakes and emulsifiers as the consistency of the solid or semi-solid shortening varies.

Since the particular properties of solid or semi-solid lard or vegetable shortening have heretofore been considered essential to the production of bread in a continuous mixing system, it has been necessary to provide the continuous mixing systems with a heating means for melting the solid or semi-solid shortening and maintaining the shortening in a hot melted condition at a temperature of at least 120° F. in order to insure that the shortening is properly introduced or metered into the first mixing stage.

While the continuous bread making process has many commercial advantages, certain problems have been experienced in the continuous mixing of bread dough which are attributed in whole or in part to the conventionally employed lard or vegetable shortenings which are solid or semi-solid at normally encountered temperatures and which must be, therefore, in a hot melted condition when introduced in the first stage premixer: First, the bread dough structure tends to be "weak" since the normally solid or semi-solid shortening only permits the use of a low level of milk solids in the dough formulation; second, the finished loaves lack resilience, i.e., the ability to bounce back when compressed; and third, the bread tends to slice poorly in automatic bread slicing equipment. Heating the solid or semi-solid shortening, particularly lard, may also be the cause of off-flavors which can be detected in the finished bread. Moreover, the use of a hot melted shortening undesirably increases the temperature of the continuous mix dough; a dough temperature above 104° F. tends to retard the development of the dough in the bread pans and may result in coarse, low-volume loaves. In addition, the solid or semi-solid lard and vegetable shortenings are high in saturated fatty acids whereas the consumers' preference is well recognized for products, including bread, which in their fat content are high in polyunsaturated fatty acids.

It is an object of the present invention to improve the continuous bread making process by eliminating the need for heating and maintaining the conventionally employed solid or semi-solid lard or vegetable shortening in a hot melted condition and by providing a shortening for use in the continuous process which is fluid at normally encountered temperatures. It is another object of this invention to provide a resilient bread loaf which can contain, if desired, a high content of milk solids and which can be produced by an improved method for making bread in a continuous mixing system, such method including the use of a normally liquid shortening high in polyunsaturated fatty acids. It is a still further object of the present invention to improve the continuous bread making process by providing a universally adoptable shortening composition for use in the continuous process which eliminates the necessity for blending shortening compositions in the bakery. And, it is a still further object of the present invention to produce continuous mix bread which slices easily in automatic bread slicing equipment.

These and other objects are achieved by the use in the continuous bread making process of a normally liquid shortening comprising a suspension in a liquid glyceride vehicle of from about 6.0 percent to about 14.0 percent by weight of shortening of substantially fully saturated fatty glyceride solids, said solids including from about 0.8 percent to about 6.0 percent by weight of shortening of monoglycerides of fatty acids having from 16 to 22 carbon atoms, from 0.0 percent to about 6.0 percent by weight of shortening of diglycerides of fatty acids having from 16 to 22 carbon atoms, and from about 2.0 percent to about 8.0 percent by weight of shortening of triglycerides of fatty acids having from 16 to 22 carbon atoms.

In composing the normally liquid shortenings for use in the instant process, any of the usual liquid triglyceride oils can be employed as a suitable vehicle if the oil is chemically stable and resistant to oxidation. Oils derived from naturally occurring liquid glyceride oils such as cottonseed oil, soybean oil, peanut oil, rapeseed oil, sesame seed oil and sunflower seed oil are very suitable vehicles. Also suitable are liquid oil fractions obtained from palm oil, lard, and tallow, as for example, by graining or directed interesterification, followed by separation of the oil. Oils predominating in glycerides of unsaturated acids may require some hydrogenation to maintain flavor, but the hydrogenation should be kept to a minimum. Also suitable are the so-called low molecular synthetic fats which are certain di- or triglycerides in which one or two of the hydroxyl groups of the glycerine have been esterified with acetic, propionic, butyric, or caproic acids, and one or two of the remaining hydroxyl groups of the glycerine have been esterified with higher molecular weight fatty acids having from 12 to 22 carbon atoms.

Any mixture of the above enumerated liquid vehicles can be used in composing normally liquid shortenings for use in the process of the present invention.

The solid glycerides which are suspended in the liquid glyceride vehicle are substantially fully saturated fatty glycerides having from 16 to 22 carbon atoms. Preferably, these solid fatty glycerides have an iodine value not greater than about 12.

The mono- and diglycerides which are employed as emulsifier solids can be derived from any suitable source and are preferably suspended in the liquid glyceride vehicle along with the balance of the fatty glyceride solids, the triglycerides, which can include tristearin, tripalmitin and other normally solid triglycerides such as palmito distearin or mixtures thereof. Substantially completely saturated triglycerides made by hydrogenating animal or vegetable oil such as cottonseed oil, sunflower seed oil, linseed oil, hazelnut oil, soybean oil, peanut oil, olive oil, corn oil, palm oil, lard, tallow and mixtures thereof are also suitable solids.

Useful mixtures of solid mono-, di- and triglycerides can be prepared by superglycerinating substantially saturated triglycerides, analyzing the mixture and then adjusting the resultant composition, if necessary, by adding appropriate substantially saturated glycerides to obtain the desired ratio of mono-, di- and triglyceride solids suitable for admixture with the liquid glyceride vehicle.

It has been found most expedient to prepare the shortenings useful in the present improved process for continuously producing bread by the methods described in Andre and Going, U.S. Patent 2,815,286, issued December 3, 1957. The proportions, however, of the fatty glyceride solids disclosed by Andre and Going are not necessarily preferred for use in the present improved method for continuous bread making wherein the proportions of the mono-, di- and triglyceride solids have been established on the basis of the individual contribution of these solids to the production of improved bread in the continuous process.

In the present improved process for making continuous bread, no less than about 0.8 percent solid monoglyceride content in the normally liquid shortening is essential to insure a satisfactory grain in the finished loaf. An overall content of solid mono- and diglycerides up to about 12.0 percent is not detrimental to the continuous mix bread but only a small improvement in performance characteristics can be attributed to the presence of the emulsifier solids in an amount greater than about 6.0 percent. When the emulsifier content exceeds about 8.0 percent, it is preferred to use more than the minimum amount of solid triglycerides; for example, better appearance of the continuous mix bread is achieved with about 4.0 percent solid triglyceride level rather than a 2.0 percent solid triglyceride level when the emulsifier content is about 12.0 percent.

As indicated above, solid diglycerides of fatty acids having from 16 to 22 carbon atoms may be present in the liquid shortenings. The diglycerides are optional ingredients but since they generally accompany the presence of monoglycerides in commercial mixtures, they need not be separated therefrom; however, the total diglyceride level must not exceed 6.0 percent.

To insure that desired performance characteristics are obtained in the present improved process for making continuous bread, it is preferred to use a normally liquid shortening containing from about 2.0 percent to about 6.0 percent of solid mono- and diglycerides and from about 3.0 percent to about 7.0 percent solid triglycerides that have been substantially completely hydrogenated such that the total fatty glyceride solids content is from about 6.0 percent to about 13.0 percent. It has been found that a shortening containing these proportions of fatty glyceride solids gives the desired improved properties to the finished bread loaves produced by the continuous process. The most highly preferred normally liquid shortening product for use in the present improved continuous bread making process contains 9.0 percent of finely divided substantially fully saturated fatty glyceride solids, 4.0 percent of the solids being mono- and diglyceride emulsifiers and 5.0 percent being solid triglycerides, the total content of mono- and diglyceride solids being at least about thirty-five percent solid monoglycerides.

To insure that the use of a normally liquid shortening in the present improved continuous bread making process is fully understood, the operation of a typical continuous system will be fully explained. A liquid "broth" or "brew" containing yeast, water, sugar, salt, milk solids and yeast nutrients is first prepared, and is permitted to ferment until there has been adequate conversion of the sugar to carbon dioxide and ethanol. After the brew has been properly fermented, the brew and the other dough ingredients are continuously delivered in metered proportions to the first mixing stage where they are continuously mixed. The other dough ingredients which are combined in this stage with the brew include the flour and the minor dry ingredients; i.e., oxidants, generally a solution of potassium bromate and potassium iodate; and hot melted shortening, most usually melted lard which may or may not contain added hardflakes and/or emulsifiers.

The resulting mixture is passed through the first mixing stage to produce a premixed dough having substantially uniform properties. The dough is thereafter subjected to high speed mixing to develop a complete dough suitable for extruding and cutting into proper dough sections which are automatically panned, the pans being conveyed to a final proofing room where the dough is proofed before baking for about one hour at about 105° F. or about one and one half hours at 90° F.

As previously explained, the established practice in the continuous bread making industry is to add a hot melted shortening to the first mixing stage at the inlet end of the premixer along with the brew, the flour and the minor ingredients. Since the most commonly employed and currently recommended plastic shortenings have a softening point of at least 110° F., it is generally necessary to heat the shortening to about 120° F. to about 140° F. to insure that the fluidity of the shortening will be maintained between the storage tank and the premixer and that the metering of the shortening will be accurate.

In the present improved continuous bread making process it is most convenient to add the normally liquid shortening to the first mixing stage at about 80° F. which is about the room temperature ordinarily encountered in commercial bakeries. Surprisingly and unexpectedly, it has been found that the firing rate, which is a measure of the softness of the finished bread, is greatly reduced when the liquid shortening is added to the first mixing stage at a temperature of about 80° F. Liquid shortenings may be added to the premixer at still lower temperatures of about 60° F. and at temperatures as high or higher than 110° F.; however, any heating of the liquid shortening materially reduces the advantages to be derived from the present improved process which in its preferred aspects contemplates the use of an unheated shortening.

Although normally liquid shortenings can be employed in the present improved continuous bread making process on a pound per pound basis for solid or semi-solid lard or vegetable shortening, lower usage levels of shortening can be achieved; for example, bread having substantially the same properties and characteristics of bread produced with lard is produced with about an eighty-five percent level of a normally liquid shortening based on the weight of lard when the normally liquid shortening is used at a temperature of about 80° F. and is added to the premixer in an amount which is not less than 2.8 percent based on the weight of flour.

It has long been known that the use of a liquid shortening in yeast raised doughs materially restricted the amount of water which the dough would tolerate. The present improved process, which utilizes a liquid shortening in the high speed continuous production of bread, does not decrease the water tolerance of the dough. While no particular theory is advanced to explain this improvement, it may be reasonably attributed to the high rate of speed at which the dough is composed and developed.

The process of the present invention is illustrated by the following examples wherein all ingredient concentrations are expressed as a percent of the flour content unless otherwise indicated.

*Example I*

A quantity of brew is composed which is sufficient to conduct two typical one hour comparative commercial runs in the continuous bread making equipment described in Baker, U.S. Patent 2,953,460. The brew is prepared by mixing the ingredients set forth below in six suitable stainless steel holding tanks at appropriate time intervals to permit the brew to ferment for two hours before use. Fermentation is carried out at 85° F. with slow agitation. Three tanks of brew are used for one hour's production of bread.

| | Pounds, per tank | Pounds, per hour | Percent, per hour |
|---|---|---|---|
| Water | 315 | 945 | 64.7 |
| Sugar | 25.3 | 76 | 5.2 |
| Salt | 9.7 | 29.1 | 2.0 |
| Milk solids | 16.7 | 50 | 3.42 |
| Calcium acid phosphate (to adjust for water hardness) | 2.7 | 8.1 | .555 |
| Calcium propionate | .7 | 2.1 | .144 |
| Enrichment tablets | 6 | 18 | 1.23 |
| Yeast foods | 2 | 6 | .41 |
| Yeast | 12.5 | 37.5 | 2.57 |

After the brew is fermented, it is cooled to 70° F. and continuously fed to the premixer where it is mixed with the following dough ingredients sufficient to produce a one hour's production of continuously mixed bread dough.

| | Pounds, per hour | Percent, per hour |
|---|---|---|
| Flour | 1,460 | 100 |
| Oxidant solution: 50% potassium iodate and 50% potassium bromate | .17 | .012 |

In this first one-hour production run, 52.25 pounds (3.578%) of a hot melted lard-flake-emulsifier mixture is continuously fed along with the flour and oxidant solution to the premixer at a temperature of 130° F. The shortening mixture is composed of 43.8 pounds (3%) lard, 4.22 pounds (.289%) substantially completely hydrogenated cottonseed hardflakes and 4.22 pounds (.289%) solid mono-glyceride emulsifier.

This dough is developed, extruded into one-pound loaf sections, panned, and proofed for one hour at 105° F. and thereafter baked.

The three additional tanks of brew prepared in the manner described above are continuously processed in a second one hour commercial production test with the quantities of flour and oxidant solution set forth above. This comparative run is similar in all respects to the first production run but for the substitution of 42.2 pounds (2.89%) of a normally liquid shortening for the 52.25 pounds (3.578%) of the lard-flake-emulsifier mixture and the addition of the liquid shortening to the premixer at a temperature of 80° F. The liquid shortening is an opaque liquid which is fluid at 80° F. comprising a liquid glyceride vehicle derived from soybean oil in which are suspended by weight of shortening 4.0 percent monoglyceride solids and 3.5 percent triglyceride solids, both having an iodine value of about eight and being derived from soybean oil.

The dough is developed, extruded into one-pound loaf sections, panned and proofed for one hour at 105° F. and thereafter baked.

The bread produced in these two separate tests is similar in volume, grain and compressibility. The bread produced with the liquid shortening, rather than the customarily employed lard-flake-emulsifier mixture, is comparable in appearance to the bread usually produced by the continuous process. In addition, the bread made with the smaller quantity liquid shortening (approximately twenty percent less than the amount of lard-flake-emulsifier mixture) slices more easily in an automatic slicing machine; no evidence is noted of "snow" or the tendency of the crumb to tear during the slicing operation.

*Example II*

Two batches of white bread are prepared in the Baker continuous bread making system described in U.S. Patent 2,953,460 using the dough recipe set forth in Example I above. In the first batch, a lard-flake-emulsifier mixture composed of 84% lard, 5% substantially completely hydrogenated cottonseed hardflakes and 11% solid monoglyceride emulsifier is continuously added to the premixer in a hot melted condition at a temperature of 120° F. In the second batch, a liquid shortening is cooled at 60° F. and added to the premixer. The liquid shortening is composed of a liquid glyceride vehicle derived from cottonseed oil in which the following solids having an iodine value of about eight are suspended in the amounts indicated by weight of shortening: 6.0 percent monoglycerides and 2.0 percent diglycerides derived from soybean oil, and 5.5 percent triglycerides derived from cottonseed oil.

Randomly selected sample wrapped loaves are taken from the production of each batch and stored at room temperature for seven days. Using a compressimeter, a portion of the loaves in each batch is tested for softness after succeeding twenty-four hours storage periods to determine the comparable firming rate of the bread. Bread made with the "cooled" liquid shortening at 60° F. firms much more slowly than the bread containing the lard-flake-emulsifier mixture.

Although the bread produced in the continuous system is largely standard white bread, the liquid shortenings herein described can be equally well employed to produce other types of continuous mix bread in the present improved process; for example, whole wheat and rye breads.

It will be apparent to those skilled in the art that variations and modifications of the present process invention can be made upon the study of the foregoing disclosure. Such variations and modifications are intended to be within the spirit and scope of this invention as defined in the appended claims.

What is claimed is:

1. In a process for the continuous production of bread comprising the steps of mixing a fermented yeast brew, continuously mixing the brew in a first mixing stage with other dough ingredients including a shortening ingredient as hereinafter defined, passing the resulting mixture through the first mixing stage to produce a premixed dough having substantially uniform properties and thereafter subjecting the premixed dough to high speed mixing to develop a complete dough suitable for extruding and cutting into dough sections, panning, proofing, and baking, the improvement which comprises continuously introducing to the first mixing stage a normally liquid shortening ingredient at a temperature of about 60° F. to about 110° F., said shortening comprising a suspension in a liquid glyceride vehicle of from about 6.0 percent to about 14.0 percent by weight of shortening of substantially fully saturated fatty glyceride solids, having an iodine value not greater than 12, said solids consisting essentially of from about 0.8 percent to about 6.0 percent by weight of shortening of monoglycerides of fatty acids having from 16 to 22 carbon atoms, from 0.0 percent to about 6.0 percent by weight of shortening of diglycerides of fatty acids having from 16 to 22 carbon atoms, and from about 2.0 percent to about 8.0 percent by weight of shortening of triglycerides of fatty acids having from 16 to 22 carbon atoms, the amount of said shortening added at the first mixing stage being an amount not less than 2.8 percent based on the weight of the flour content in the dough.

2. The process of claim 1 wherein the liquid glyceride vehicle is derived from a fatty material selected from the group consisting of cottonseed oil, soybean oil, peanut oil, rapeseed oil, sesame seed oil, sunflower seed oil, palm oil, lard, low molecular synthetic fats, and mixtures thereof, and wherein the substantially fully saturated fatty glycerides are derived from fatty materials selected from the group consisting of cottonseed oil, sunflower seed oil, linseed oil, hazelnut oil, soybean oil, peanut oil, olive oil, corn oil, palm oil, lard, tallow and mixtures thereof.

3. The process of claim 1 wherein the liquid glyceride vehicle is derived from soybean oil and the substantially fully saturated fatty glycerides are derived from soybean oil.

4. In a process for the continuous production of bread comprising the steps of mixing a fermented yeast brew, continuously mixing the brew in a first mixing stage with other dough ingredients including a shortening ingredient as hereinafter defined, passing the resulting mixture through the first mixing stage to produce a premixed dough having substantially uniform properties and thereafter subjecting the premixed dough to high speed mixing to develop a complete dough suitable for extruding and cutting into dough sections, panning, proofing, and baking, the improvement which comprises continuously introducing to the first mixing stage a normally liquid shortening ingredient at a temperature of about 60° F. to about 110° F., said shortening comprising a liquid glyceride vehicle having substantially fully saturated fatty glyceride solids having an iodine value not greater than about 12 suspended therein, said solids consisting essentially of from about 2.0 percent to about 6.0 percent of substantially fully saturated mono- and diglyceride solids of fatty acids having from 16 to 22 carbon atoms of which at least about 0.8 percent is monoglyceride solids and from about 3.0 percent to about 7.0 percent of substantially completely hydrogenated triglyceride solids of fatty acids having from 16 to 22 carbon atoms such that the total fatty glyceride solids content is from about 6.0 percent to about 13.0 percent by weight of said shortening, the amount of said shortening added at the first mixing stage being an amount not less than 2.8 percent based on the weight of the flour content in the dough.

5. The process of claim 4 wherein the liquid glyceride vehicle is derived from a fatty material selected from the group consisting of cottonseed oil, soybean oil, peanut oil, rapeseed oil, sesame seed oil, sunflower seed oil, palm oil, lard, low molecular synthetic fats, and mixtures thereof, and wherein the substantially fully saturated fatty glycerides are derived from fatty materials selected from the group consisting of cottonseed oil, sunflower seed oil, linseed oil, hazelnut oil, soybean oil, peanut oil, olive oil, corn oil, palm oil, lard, tallow and mixtures thereof.

6. The process of claim 4 wherein the liquid glyceride vehicle is derived from soybean oil and the substantially fully saturated fatty glycerides are derived from soybean oil.

7. In a process for the continuous production of bread comprising the steps of mixing a fermented yeast brew, continuously mixing the brew in a first mixing stage with other dough ingredients including a shortening ingredient as hereinafter defined, passing the resulting mixture through the first mixing stage to produce a premixed dough having substantially uniform properties and thereafter subjecting the premixed dough to high speed mixing to develop a complete dough suitable for extruding and cutting into dough sections, panning, proofing, and baking, the improvement which comprises continuously introducing to the first mixing stage a normally liquid shortening ingredient at a temperature of about 80° F., said shortening comprising a suspension in a liquid glyceride vehicle of 9.0 percent by weight of shortening of substantially fully saturated fatty glyceride solids having an iodine value not greater than about 12, said solids consisting essentially of 4.0 percent by weight of shortening of mono- and diglycerides of fatty acids having from 16 to 22 carbon atoms of which at least about 0.8 percent by weight of shortening is monoglyceride, and 5.0 percent by weight of shortening of triglycerides of fatty acids having from 16 to 22 carbon atoms, the amount of said shortening added to the first mixing stage being an amount not less than 2.8 percent based on the weight of the flour content in the dough.

References Cited by the Examiner

UNITED STATES PATENTS

| | | | |
|---|---|---|---|
| 2,815,286 | 12/1957 | Andre et al. | 99—118 |
| 2,864,703 | 12/1958 | Schulman | 99—91 |
| 3,011,896 | 12/1961 | Eber et al. | 99—118 |

FOREIGN PATENTS

| | | |
|---|---|---|
| 618,310 | 4/1961 | Canada. |
| 788,827 | 1/1958 | Great Britain. |

OTHER REFERENCES

The Baker's Digest, vol. 34, No. 3, June 1960 (pp. 56, 68 and 60), Practical Production Problems of Continuous Doughmaking, Swortfiguer.

Baker's Weekly, volume 186, No. 7, May 16, 1960 (pp. 33–36) Continuous Mix Operations Varying Nonfat Dry Milk, Swortfiguer.

A. LOUIS MONACELL, *Primary Examiner.*

B. H. STRIZAK, S. J. BAICKER, J. M. GOLIAN, *Assistant Examiners.*